United States Patent
Sun et al.

(10) Patent No.: US 12,229,426 B2
(45) Date of Patent: Feb. 18, 2025

(54) CAPACITY EXPANSION METHOD AND SYSTEM FOR A STORAGE CLUSTER, AND RELATED DEVICE

(71) Applicant: INSPUR SUZHOU INTELLIGENT TECHNOLOGY CO., LTD., Jiangsu (CN)

(72) Inventors: Runyu Sun, Shandong (CN); Xiangrui Meng, Shandong (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/029,703

(22) PCT Filed: Sep. 28, 2021

(86) PCT No.: PCT/CN2021/121224
§ 371 (c)(1),
(2) Date: Mar. 31, 2023

(87) PCT Pub. No.: WO2022/105441
PCT Pub. Date: May 27, 2022

(65) Prior Publication Data
US 2023/0384959 A1 Nov. 30, 2023

(30) Foreign Application Priority Data
Nov. 20, 2020 (CN) .......................... 202011311240.5

(51) Int. Cl.
*G06F 3/06* (2006.01)
(52) U.S. Cl.
CPC .......... *G06F 3/0644* (2013.01); *G06F 3/0604* (2013.01); *G06F 3/0673* (2013.01)
(58) Field of Classification Search
CPC ..... G06F 3/0673; G06F 3/0604; G06F 3/0644
See application file for complete search history.

(56) References Cited

U.S. PATENT DOCUMENTS

| | | | | |
|---|---|---|---|---|
| 2010/0115210 A1* | 5/2010 | Wicklund | ............. | G06F 3/0632 711/E12.001 |
| 2017/0139840 A1* | 5/2017 | Klein | .................... | G06F 3/0644 |
| 2017/0153829 A1* | 6/2017 | Patel | ................... | G06F 11/3668 |

FOREIGN PATENT DOCUMENTS

| | | |
|---|---|---|
| CN | 104407807 A | 3/2015 |
| CN | 106991170 A | 7/2017 |

(Continued)

OTHER PUBLICATIONS

International Search Report and Written Opinion issued by China National Intellectual Property Administration dated on Jan. 4, 2022 (6 total pages).

*Primary Examiner* — Edward J Dudek, Jr.
(74) *Attorney, Agent, or Firm* — DINSMORE & SHOHL LLP

(57) ABSTRACT

A capacity expansion method for a storage cluster has the following steps: receiving an expansion instruction and determining a new expansion node corresponding to the instruction; traversing all placement groups to determine reference counts of OSDs corresponding to each of the groups, wherein the reference count of each OSD is the same as the number of groups; setting the OSD with the largest reference count associated with each group as an OSD to be determined; calling a data distribution interface to select an optimal OSD from the new node to replace the OSD to be determined. The OSD with the largest reference count associated with each group can only be replaced by an OSD in the new node, so that the data migration between the old nodes is eliminated, thereby improving expansion and reconstruction efficiency, reducing the resource utilization rate when the system is being expanded, and improving system performance.

20 Claims, 2 Drawing Sheets

(56) References Cited

FOREIGN PATENT DOCUMENTS

| | | | |
|---|---|---|---|
| CN | 108509153 | A | 9/2018 |
| CN | 111190775 | A | 5/2020 |
| CN | 111880747 | A | 11/2020 |
| CN | 111930317 | A | 11/2020 |
| CN | 112463043 | A | 3/2021 |
| WO | 2017206649 | A1 | 12/2017 |

* cited by examiner

CAPACITY EXPANSION METHOD AND SYSTEM FOR A STORAGE CLUSTER, AND RELATED DEVICE

CROSS REFERENCES TO RELATED APPLICATIONS

The present application claims the priority of International Patent Application No. PCT/US2021/121224 filed on Sep. 28, 2021, which claims priority to Chinese patent application filed in Chinese Patent Office on Nov. 20, 2020, with the application number of 202011311240.5 and the title of invention of "Capacity expansion method and system for a storage cluster, and related device", their entire contents of which are hereby incorporated into the present application by reference.

TECHNICAL FIELD

The present application relates to the technical field of data storage, and particularly relates to a capacity expansion method and a capacity expansion system for a storage cluster, and a related device.

BACKGROUND TECHNOLOGY

In a distributed storage system, the stored content data is divided into pieces of data according to a fixed size, and this piece of data with a fixed size is called an object, and PG (Placement Group, a carrier for placing objects) is an aggregation of multiple objects. The correspondence between each PG and OSD (Object-based Storage Device) is based on data distribution algorithm. One PG corresponds to multiple OSDs, the OSD can be simply understood as a physical disk. There can be multiple PGs on one OSD, and the stored contents are deposited on the disk. When expanding nodes, the data distribution algorithm will re-select the OSDs for all PGs through a series of calculations. After the selection is completed, data migration needs to be performed on the newly added OSD member in the PG. However, in the process of data migration, the newly added OSD member of a PG after the re-selection may easily still be an OSD of an old node. However, because there is no data of this PG stored on this OSD, data migration is still needed, so there is extra migration amount during the expansion, which not only occupies system resources, but also reduces the expansion efficiency.

SUMMARY

The purpose of the present application is to provide a capacity expansion method for a storage cluster, a capacity expansion system for a storage cluster, a computer-readable storage medium and a storage device, which can improve the expansion efficiency.

In order to solve the above technical problem, in one aspect, the present application provides a capacity expansion method for a storage cluster, and the specific technical scheme thereof is as follows:

receiving an expansion instruction and determining a new expansion node corresponding to the expansion instruction;

traversing all placement groups to determine reference counts of OSDs corresponding to each of the placement groups, wherein the reference count of each OSD is the same as the number of placement groups stored thereon;

setting the OSD with the largest reference count associated with each placement group as an OSD to be determined;

calling a data distribution interface to select an optimal OSD from the new expansion node to replace the OSD to be determined.

In some embodiments, after calling the data distribution interface to select the optimal OSD from the new expansion node to replace the OSD to be determined, the method further comprises:

determining whether the optimal OSD and the OSD to be determined belong to the same fault domain;

if the optimal OSD and the OSD to be determined belong to the same fault domain, refusing to replace the OSD to be determined with the optimal OSD;

if the optimal OSD and the OSD to be determined do not belong to the same fault domain, replacing the OSD to be determined with the optimal OSD.

In some embodiments, calling the data distribution interface to select the optimal OSD from the new expansion node to replace the OSD to be determined comprises:

calling a preset hash algorithm to perform hash calculation for each expansion node in the new expansion node;

determining, in an expansion node with a largest hash value, a new OSD with a largest hash value as the optimal OSD;

replacing the OSD to be determined with the optimal OSD.

In some embodiments, determining, in an expansion node with a largest hash value, a new OSD with a largest hash value as the optimal OSD comprises:

calculating the hash value corresponding to each OSD in the expansion node with the largest hash value based on the number of attempts, OSD name and OSD weight respectively;

taking the OSD with the largest hash value as the optimal OSD.

In some embodiments, after replacing the OSD to be determined with the optimal OSD, the method further comprises changing the reference count of the OSD.

In some embodiments, after determining a new expansion node corresponding to the expansion instruction, the method further comprises:

storing the new expansion node by using a preset data distribution structure.

In some embodiments, before calculating the hash value corresponding to each OSD in the expansion node with the largest hash value based on the number of attempts, OSD name and OSD weight respectively, the method further comprises:

determining the OSD weight of each OSD according to the capacity of each OSD.

In another aspect, the present application also provides a capacity expansion system for a storage cluster, comprising:

an instruction receiving module, configured to receive an expansion instruction and determine a new expansion node corresponding to the expansion instruction;

a counting module, configured to traverse all placement groups to determine reference counts of OSDs corresponding to each of the placement groups, wherein the reference count of each OSD is the same as the number of placement groups stored thereon;

an expansion preparation module, configured to set the OSD with the largest reference count associated with each placement group as an OSD to be determined;

an expansion module, configured to call a data distribution interface to select an optimal OSD from the new expansion node to replace the OSD to be determined.

In another aspect, the present application also provides a computer-readable storage medium, on which a computer program is stored, and the computer program, when executed by a processor, implements the steps of the capacity expansion method for a storage cluster as described above.

In another aspect, the present application also provides a storage device, comprising a memory and a processor, wherein a computer program is stored in the memory, and the processor is configured to call the computer program in the memory to implement the steps of the capacity expansion method for a storage cluster as described above.

The present application provides a capacity expansion method for a storage cluster, which comprises the following steps: receiving an expansion instruction and determining a new expansion node corresponding to the expansion instruction; traversing all placement groups to determine reference counts of OSDs corresponding to each of the placement groups, wherein the reference count of each OSD is the same as the number of placement groups stored thereon; setting the OSD with the largest reference count associated with each placement group as an OSD to be determined; calling a data distribution interface to select an optimal OSD from the new expansion node to replace the OSD to be determined.

By calculating the reference counts of OSDs corresponding to each of the placement groups, the OSD with the largest reference count is set as an OSD to be determined, and then a data distribution interface is called to configure a new OSD for the placement groups from a new expansion node, so that the OSD with the largest reference count corresponding to each of placement groups will only be replaced by an OSD in the new expansion node, and the data migration between the old nodes is eliminated, thereby improving the expansion and reconstruction efficiency, reducing the resource utilization rate when the system is being expanded, and improving the performance of the storage system.

The present application also provides a capacity expansion system for a storage cluster, a computer-readable storage medium and a storage device, which have the above beneficial effects and will not be described repeatedly herein.

BRIEF DESCRIPTION OF DRAWINGS

In order to more clearly explain the technical scheme in the embodiments of the present application or in the prior art, hereinafter, drawings needed to be used in the description of the embodiments or the prior art are briefly introduced. Apparently, the drawings described below are only examples of the present application. For a person with ordinary skill in the art, other drawings can be obtained according to the provided drawings without expenditure of creative labor.

DETAILED DESCRIPTION OF SPECIFIC EMBODIMENTS

In order to make the purpose, technical scheme and advantages of the embodiments of the present application clearer, the technical scheme in the embodiments of the present application will be described clearly and completely with reference to the appended drawings hereinafter. Apparently, the described embodiments are a part of the embodiments of the present application, but not all of the embodiments. Based on the embodiments described in the present application, all other embodiments obtainable by a person with ordinary skill in the art without expenditure of creative labor belong to the protection scope of the present application.

Figure 1:
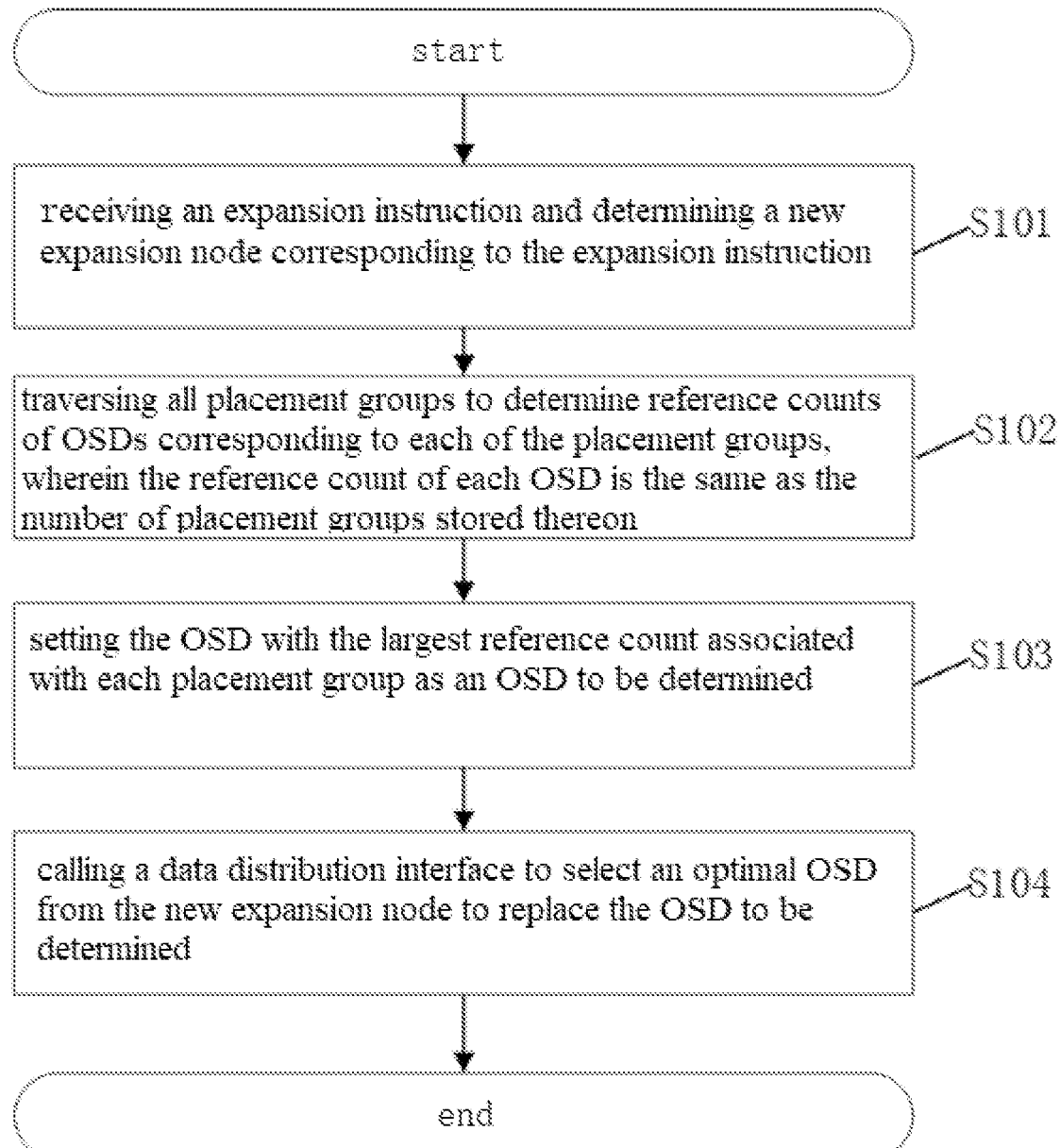
FIG. 1 is a flowchart of a capacity expansion method for a storage cluster provided by an embodiment of the present application.

As shown in FIG. 1, which is a flowchart of a capacity expansion method for a storage cluster provided by an embodiment of the present application, and the method comprises:

S101: Receiving an expansion instruction and determining a new expansion node corresponding to the expansion instruction;

The purpose of this step is to receive the expansion instruction and determine the new expansion node corresponding to the expansion instruction. The expansion instruction can contain its corresponding new expansion node, and in addition, the new expansion node can be stored by using a preset data distribution structure. There is no specific limitation on what kind of preset data distribution structure to use, and an independent data distribution structure may be constructed by using a data distribution algorithm to store new expansion nodes. It should be noted that the new expansion node also contains the corresponding OSD. For example, the newly expanded node is host4 with OSD.9, OSD.10 and OSD.11 on it, then the main information in the data distribution structure is the above-mentioned node host4 and the corresponding OSD information.

Of course, if a data distribution algorithm is used to construct the preset data subsection structure, the expansion instruction can also contain relevant information such as the data distribution algorithm.

In this step, the expansion instruction may originate from an expansion command sent by an external device, or when a new expansion node is received, it is deemed that the expansion instruction is received. In other words, the expansion instruction can be regarded as a trigger condition of expansion, which is not necessarily an instruction, but can also be another condition that can be equivalently regarded as needing expansion.

S102, traversing all placement groups to determine reference counts of OSDs corresponding to each of the placement groups, wherein the reference count of each OSD is the same as the number of placement groups stored thereon;

In this step, it is necessary to traverse all placement groups, that is, traverse all PGs, and count the number of PGs stored on each OSD. For example, suppose a PG has an ID of 1.0 and the distribution thereof is [OSD.0, OSD.3, OSD.6], then the reference counts of OSD.0, OSD.3, OSD.6 are all increased by 1, and for another PG1.1, whose distribution is [OSD.0, OSD.3, OSD.7], then the reference counts of OSD.0 and OSD.3 are both set to be 2, and that of OSD.7 is set to be 1, and so on, and in such a way, the reference counts of all OSDs are counted. It is easy to understand that the reference count of each OSD is the sum of PGs corresponding to this OSD at present, that is, the reference count of each OSD is the same as the number of placement groups it carries.

Of course, the above example only takes the distribution of each placement group including three OSDs as an example. In an actual storage system, each placement group can include several OSDs, so it is necessary to count the corresponding OSDs one by one with respect to each PG, and finally get the reference counts of all OSDs.

S103, setting the OSD with the largest reference count associated with each placement group as an OSD to be determined;

In this step, the OSD with the largest reference count associated with each PG needs to be set as the OSD to be determined, specifically, the OSD with the largest reference count can be set as undefined. Setting the OSD with the largest reference count as the OSD to be determined can make the OSD distribution relatively uniform in the storage system, so as to avoid the situation that the same OSD corresponds to a lot of placement groups and another OSD corresponds to no placement group or a few placement groups, that is, the problem of unbalanced storage resources. Therefore, during capacity expansion, the OSD with the largest reference count associated with each placement group is preferentially replaced by means of the new expansion node.

S104: calling a data distribution interface to select an optimal OSD from the new expansion node to replace the OSD to be determined.

After determining the OSD to be determined associated with each placement group in S103, the data distribution interface can be called to select the optimal OSD from the new expansion node to replace the OSD to be determined. It is easy to understand that this step needs to determine the optimal OSD in the new expansion node by default. There is no specific limitation on how to determine the optimal OSD, and the optimal OSD corresponding to each placement group is not necessarily the same.

Figure 3:
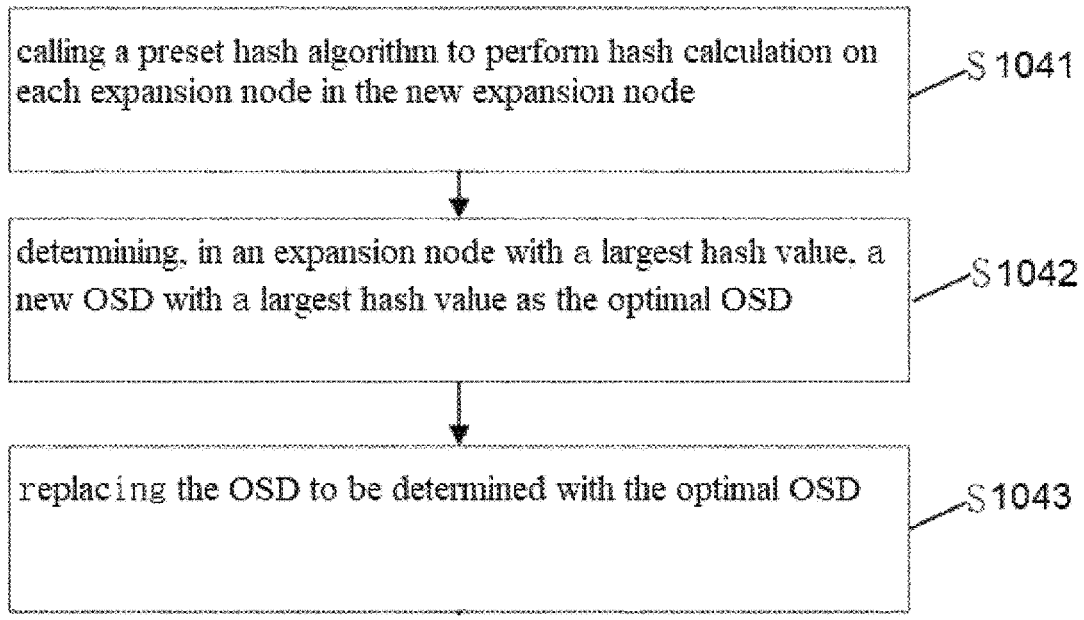
FIG. 3 is a flowchart of a preferred execution mode of the step S104 provided by an embodiment of the present application.

As shown in FIG. 3, this embodiment provides a preferred execution mode of this step, which may comprise the following steps:

S1041: calling a preset hash algorithm to perform hash calculation on each expansion node in the new expansion node;

The purpose of this step is to call the preset hash algorithm for hash calculation of each expansion node, and it should be noted that the objects of calculation include not only the expansion nodes, but also the OSDs corresponding to each expansion node. Specifically, the hash value of each expansion node can be determined based on the number of attempts, expansion node name and expansion node weight.

S1042: determining, in an expansion node with a largest hash value, a new OSD with a largest hash value as the optimal OSD.

After determining the expansion node with the largest hash value, the hash value corresponding to each OSD can be calculated based on the number of attempts, OSD name and OSD weight for the expansion node with the largest hash value, and then the OSD with the largest hash value is taken as the optimal OSD.

S1043: replacing the OSD to be determined with the optimal OSD.

Finally, the optimal OSD can be used to replace the OSD to be determined.

In the above steps, the number of attempts refers to the number of calculations. It is easy to understand that, after the above calculation process, a certain OSD can be obtained as the optimal OSD, but at this time, it can also be determined whether the optimal OSD and the OSD to be determined belong to the same fault domain. If they belong to the same fault domain, refuse to replace the OSD to be determined with the optimal OSD. If they do not belong to the same fault domain, replace the OSD to be determined with the optimal OSD. In other words, if the optimal OSD obtained by the above calculation process belongs to the same fault domain as the OSD with the largest reference count associated with the placement group, the replacement fails. In such a situation, the hash calculation process can be re-executed, but the number of attempts in the calculation process must be increased by 1 both for expansion nodes and for OSDs. There is usually an upper limit on the number of attempts, such as 50 or 100. If the replacement still fails after the upper limit of the number of attempts is reached, the OSD replacement may not be performed, or another OSD which does not belong to the same fault domain as the OSD with the largest reference count associated with the placement group is selected from the new expansion node for replacement.

In addition, before calculating the hash value corresponding to each OSD based on the number of attempts, OSD name and OSD weight in the expansion node with largest hash value, the OSD weight of each OSD can be determined according to the capacity of each OSD, that is, the OSD capacity corresponds to the OSD weight, and after the OSD capacity is uniquely determined, the corresponding OSD weight is also uniquely determined. This embodiment does not specifically limit the conversion process between OSD capacity and OSD weight.

It should be noted that if it is determined that the optimal OSD and the OSD to be determined belong to the same fault domain, that is, this replacement fails, at this time, the replacement process for the next placement group can be carried out first, and after all placement groups are calculated, then recalculation is done for the placement group that initially fails to be replaced. For example, on the distribution [OSD.0, OSD.3, OSD.6] of PG1.0, the reference count of OSD.0 is 170, the reference count of OSD.3 is 170, and the reference count of OSD.6 is 172, so OSD.6 is temporarily set to undefined, that is, the distribution of PG1.0 becomes [OSD.0, OSD.3, undefined]. Call the data distribution algorithm interface, input relevant information, and use the data distribution structure constructed in step 2 to calculate the distribution information for it. If no result can be calculated, the calculation fails, and the distribution of the PG will remain unchanged, and the process continues to traverse the next PG. If the calculation is successful, and it is assumed that the OSD returned to replace the undefined is OSD.9, then the members of the PG will be changed to [OSD.0, OSD.3, OSD.9], and at the same time, the reference count of OSD.9 is increased by 1, and the reference count of OSD.6 is decreased by 1. Of course, it is easy to be understood that, after the OSD to be determined is replaced by the optimal OSD, the reference counts of the related OSDs can be automatically updated, so that the reference counts of the related OSDs can be quickly determined at the next time when expansion is performed, and the expansion efficiency can be improved.

In the embodiment of the present application herein, by calculating the reference counts of OSDs corresponding to each of the placement groups, the OSD with the largest reference count is set as an OSD to be determined, and then the data distribution interface is called to configure a new OSD for the placement groups from a new expansion node, so that the OSD with the largest reference count corresponding to each of the placement groups will only be replaced by an OSD in the new expansion node, and data migration between the old nodes is eliminated, thereby improving the expansion and reconstruction efficiency, reducing the resource utilization rate when the system is being expanded, and improving the performance of the storage system.

Next, a capacity expansion system for a storage cluster provided by an embodiment of the present application is described, and the capacity expansion system described below and the capacity expansion method of a storage cluster described above can refer to each other correspondingly.

Figure 2:
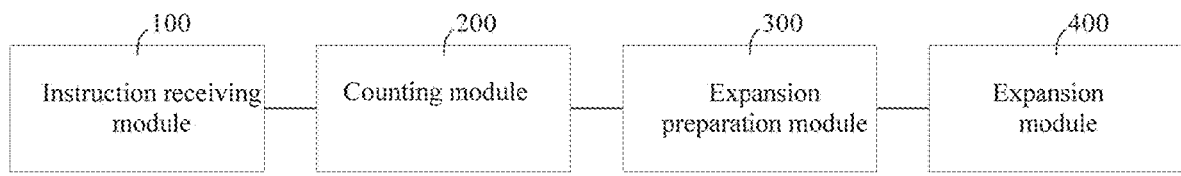
FIG. 2 is a schematic structural diagram of a capacity expansion system for a storage cluster provided by an embodiment of the present application.

As shown in FIG. 2, which is a schematic structural diagram of a capacity expansion system for a storage cluster provided by an embodiment of the present application, the present application also provides a capacity expansion system for a storage cluster, comprising:

an instruction receiving module 100, configured to receive an expansion instruction and determine a new expansion node corresponding to the expansion instruction;

a counting module 200, configured to traverse all placement groups to determine reference counts of OSDs corresponding to each of the placement groups, wherein the reference count of each OSD is the same as the number of placement groups stored thereon;

an expansion preparation module 300, configured to set the OSD with the largest reference count associated with each placement group as an OSD to be determined;

an expansion module 400, configured to call a data distribution interface to select an optimal OSD from the new expansion node to replace the OSD to be determined.

Based on the above embodiments, as a preferred embodiment, the system further comprises:

an optimal OSD determining module, configured to determine whether the optimal OSD and the OSD to be determined belong to the same fault domain; if the optimal OSD and the OSD to be determined belong to the same fault domain, refuse to replace the OSD to be determined with the optimal OSD; if the optimal OSD and the OSD to be determined do not belong to the same fault domain, replace the OSD to be determined with the optimal OSD.

Based on the above embodiments, as a preferred embodiment, the expansion module 400 comprises:

a calculation unit, configured to call a preset hash algorithm to perform hash calculation on each expansion node in the new expansion nodes;

an optimal OSD determination unit, configured to determine, in an expansion node with a largest hash value, a new OSD with the largest hash value as the optimal OSD;

a replacement unit, configured to replace the OSD to be determined with the optimal OSD.

Based on the above embodiments, as a preferred embodiment, the optimal OSD determination unit is configured to calculate the hash value corresponding to each OSD in the expansion node with the largest hash value based on the number of attempts, OSD name and OSD weight respectively; and take the OSD with the largest hash value as the unit of the optimal OSD.

Based on the above embodiments, as a preferred embodiment, the system further comprises:

a count updating module, configured to change the reference count of OSD.

Based on the above embodiments, as a preferred embodiment, the system further comprises:

a storage module, configured to store the new expansion node by using a preset data distribution structure.

The present application also provides a computer-readable storage medium, wherein the computer-readable storage medium stores a computer program; and the computer program, when executed by a processor, implements the steps provided by the above embodiments. The storage medium can include various media that can store program codes, such as a U disk, a mobile hard disk, a Read-Only Memory (ROM), a Random Access Memory (RAM), a magnetic disk or an optical disk.

The present application also provides a storage device, comprising a memory and a processor, wherein a computer program is stored in the memory, and the processor is configured to call the computer program in the memory to implement the steps provided in the above embodiments. Of course, the storage device can also comprise various other components, such as a network interface, a power supply, etc.

Each embodiment in the specification is described in a progressive way, and each embodiment focuses on its differences from other embodiments, and the same and similar parts among embodiments can be referred to each other. As for the system provided by the embodiments, the description thereof is relatively simple because it corresponds to the method provided by the embodiments. For relevant information, please refer to the description in the method section.

In the present application, specific embodiments are used to explain the principle and implementation of the present application, and the description of the above embodiments is only used to help the reader understand the method and core idea of the present application. It should be pointed out that, for those skilled in the art, without departing from the principles of the present application, various improvements and modifications can be made to the present application, and these improvements and modifications also fall within the protection scope of the claims of the present application.

It should also be noted that, in this specification, relational terms such as first and second are only used to distinguish one entity or operation from another entity or operation, and do not necessarily require or imply any such actual relationship or order between these entities or operations. Moreover, the terms "comprising", "including" or any other variation thereof are intended to cover non-exclusive inclusion, so that a process, method, article or equipment including a series of elements includes not only those elements, but also other elements not explicitly listed or elements inherent to such process, method, article or equipment. Without further restriction, an element defined by the phrase "comprising a/an . . . " does not exclude the existence of other identical elements in the process, method, article or equipment comprising the element.

The invention claimed is:

1. A capacity expansion method for a storage cluster, comprising:
receiving an expansion instruction and determining a new expansion node corresponding to the expansion instruction;
traversing all placement groups to determine reference counts of Object-based Storage Devices (OSDs) corresponding to each of the placement groups, wherein the reference count of each OSD is the same as the number of placement groups stored thereon;

setting the OSD with the largest reference count associated with each placement group as an OSD to be determined;

replacing the OSD to be determined in each of the placement groups by using the new expansion node.

2. The capacity expansion method for a storage cluster according to claim 1, wherein, replacing the OSD to be determined in each of the placement groups by using the new expansion node comprising:

calling a data distribution interface to select an optimal OSD from the new expansion node to replace the OSD to be determined.

3. The capacity expansion method for a storage cluster according to claim 2, wherein after calling the data distribution interface to select the optimal OSD from the new expansion node to replace the OSD to be determined, the method further comprises:

determining whether the optimal OSD and the OSD to be determined belong to the same fault domain;

if the optimal OSD and the OSD to be determined belong to the same fault domain, refusing to replace the OSD to be determined with the optimal OSD;

if the optimal OSD and the OSD to be determined do not belong to the same fault domain, replacing the OSD to be determined with the optimal OSD.

4. The capacity expansion method for a storage cluster according to claim 3, wherein after replacing the OSD to be determined with the optimal OSD, the method further comprises changing the reference count of the OSD.

5. The capacity expansion method for a storage cluster according to claim 3, wherein the method further comprises:

if the optimal OSD and the OSD to be determined belong to the same fault domain, then it is judged that the replacement fails, and a hash calculation process is re-executed, and the number of attempts in the calculation process is increased by 1 both for expansion nodes and for OSDs.

6. The capacity expansion method for a storage cluster according to claim 5, wherein the method further comprises setting an upper limit for the number of attempts.

7. The capacity expansion method for a storage cluster according to claim 6, wherein the method further comprises:

if the replacement still fails after the upper limit of the number of attempts is reached, the OSD replacement is not performed.

8. The capacity expansion method for a storage cluster according to claim 6, wherein the method further comprises:

if the replacement still fails after the upper limit of the number of attempts is reached, another OSD which does not belong to the same fault domain as the OSD with the largest reference count associated with the placement group is selected from the new expansion node for replacement.

9. The capacity expansion method for a storage cluster according to claim 3, wherein calling the data distribution interface to select the optimal OSD from the new expansion node to replace the OSD to be determined comprises:

calling a preset hash algorithm to perform hash calculation for each expansion node in the new expansion node, and the objects of the hash calculation including the expansion nodes and the OSDs corresponding to each expansion node;

determining, in an expansion node with a largest hash value, a new OSD with a largest hash value as the optimal OSD;

replacing the OSD to be determined with the optimal OSD.

10. The capacity expansion method for a storage cluster according to claim 9, wherein the method further comprises:

determining the hash value of each expansion node based on number of attempts, expansion node name and expansion node weight.

11. The capacity expansion method for a storage cluster according to claim 9, wherein determining, in an expansion node with a largest hash value, a new OSD with a largest hash value as the optimal OSD comprises:

calculating the hash value corresponding to each OSD in the expansion node with the largest hash value based on the number of attempts, OSD name and OSD weight respectively;

taking the OSD with the largest hash value as the optimal OSD.

12. The capacity expansion method for a storage cluster according to claim 11, wherein before calculating the hash value corresponding to each OSD in the expansion node with the largest hash value based on the number of attempts, OSD name and OSD weight respectively, the method further comprises:

determining the OSD weight of each OSD according to the capacity of each OSD.

13. The capacity expansion method for a storage cluster according to claim 1, wherein after determining a new expansion node corresponding to the expansion instruction, the method further comprises:

storing the new expansion node by using a preset data distribution structure.

14. The capacity expansion method for a storage cluster according to claim 13, wherein storing the new expansion node by using a preset data distribution structure comprising:

constructing an independent data distribution structure using a data distribution algorithm, wherein the independent data distribution structure is used for storing new expansion nodes.

15. The capacity expansion method for a storage cluster according to claim 14, wherein the expansion instruction contains relevant information of the data distribution algorithm.

16. The capacity expansion method for a storage cluster according to claim 1, wherein the expansion instruction containing a trigger condition of expansion.

17. A non-transitory computer-readable storage medium, wherein the non-transitory computer-readable storage medium stores a computer program; and the computer program, when executed by a processor, implements the steps of a capacity expansion method for a storage cluster, and the capacity expansion method comprises:

receiving an expansion instruction and determining a new expansion node corresponding to the expansion instruction;

traversing all placement groups to determine reference counts of OSDs corresponding to each of the placement groups, wherein the reference count of each OSD is the same as the number of placement groups stored thereon;

setting the OSD with the largest reference count associated with each placement group as an OSD to be determined;

replacing the OSD to be determined in each of the placement groups by using the new expansion node.

18. The non-transitory computer-readable storage medium according to claim 17, wherein, replacing the OSD to be determined in each of the placement groups with the new expansion node comprising:

calling a data distribution interface to select an optimal OSD from the new expansion node to replace the OSD to be determined.

19. A storage device, comprising a memory and a processor, wherein a computer program is stored in the memory, and the processor is configured to call the computer program in the memory to implement the steps of a capacity expansion method and the capacity expansion method comprises:

receiving an expansion instruction and determining a new expansion node corresponding to the expansion instruction;

traversing all placement groups to determine reference counts of OSDs corresponding to each of the placement groups, wherein the reference count of each OSD is the same as the number of placement groups stored thereon;

setting the OSD with the largest reference count associated with each placement group as an OSD to be determined;

replacing the OSD to be determined in each of the placement groups by using the new expansion node.

20. The storage device according to claim 19, wherein, the step of replacing the OSD to be determined in each of the placement groups by using the new expansion node comprising: calling a data distribution interface to select an optimal OSD from the new expansion node to replace the OSD to be determined.

* * * * *